(12) United States Patent
Hou et al.

(10) Patent No.: US 6,561,076 B2
(45) Date of Patent: May 13, 2003

(54) DIFFERENTIAL CONFIGURATION OF REMOTE HYDRAULIC VALVE FLOW RATES FOR EXTEND AND RETRACT MODES OF OPERATION

(75) Inventors: Yanming Hou, Racine, WI (US); Curtis A. Halgrimson, Valley City, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/845,591

(22) Filed: Apr. 30, 2001

(65) Prior Publication Data
US 2002/0157712 A1 Oct. 31, 2002

(51) Int. Cl.[7] .............................................. G06F 19/00
(52) U.S. Cl. ............................ 91/443; 60/386; 701/50
(58) Field of Search .............................. 91/443; 60/386, 60/422; 701/50

(56) References Cited

U.S. PATENT DOCUMENTS

| | | | | |
|---|---|---|---|---|
| 2,547,861 A | * | 4/1951 | Fletcher ........................ | 91/443 |
| 2,579,134 A | * | 12/1951 | Worthington ................ | 91/443 |
| 2,592,906 A | * | 4/1952 | Jirsa et al. .................... | 91/443 |
| 3,187,637 A | * | 6/1965 | Edmund ....................... | 91/443 |
| 3,587,639 A | * | 6/1971 | Namaki ........................ | 91/443 |
| 4,072,087 A | * | 2/1978 | Mueller ........................ | 91/461 |
| 4,385,353 A | * | 5/1983 | Schneider .................... | 701/50 |
| 4,699,239 A | * | 10/1987 | Ishino et al. .................. | 701/50 |
| 4,910,673 A | * | 3/1990 | Narisawa et al. ............. | 701/50 |
| 5,455,769 A | * | 10/1995 | Panoushek et al. ........... | 701/50 |
| 5,854,988 A | * | 12/1998 | Davidson et al. ............. | 701/50 |
| 5,918,195 A | | 6/1999 | Halgrimson et al. | |
| 6,047,228 A | * | 4/2000 | Stone et al. ................... | 701/50 |
| 6,112,839 A | | 9/2000 | Ostler et al. | |
| 6,185,493 B1 | * | 2/2001 | Skinner et al. ............... | 701/50 |
| 6,293,033 B1 | * | 9/2001 | Moriya et al. ................ | 701/50 |
| 6,377,192 B1 | * | 4/2002 | Bellanger .................... | 701/50 |
| 2002/0035426 A1 | * | 3/2002 | Chen et al. ................... | 701/50 |
| 2002/0087244 A1 | * | 7/2002 | Dix et al. ..................... | 701/50 |

* cited by examiner

*Primary Examiner*—John Rivell
(74) *Attorney, Agent, or Firm*—A. N. Trausch

(57) ABSTRACT

A method of individually adjusting auxiliary hydraulic valves for work vehicles is provided such that they provide different maximum flow rates for opposite flow directions through the valve. The valve is controlled by a flow rate control for setting a maximum flow rate and is also controlled by a proportional control input device having one range of positions for providing a corresponding first range of flow rates in the one direction, a central position for providing substantially no flow, and another range of positions for providing a corresponding second range of flow rates in the other direction. The method of adjusting the valves includes the steps of electronically selecting a first auxiliary valve from a plurality of available auxiliary valves, electronically selecting a first direction of operation of the first auxiliary valve, electronically selecting a desired first offset signal for the first direction of operation of the first auxiliary valve, and saving the first offset signal in association with an identifier of the first valve and the first direction in an electronic memory.

15 Claims, 8 Drawing Sheets

DIFFERENTIAL CONFIGURATION OF REMOTE HYDRAULIC VALVE FLOW RATES FOR EXTEND AND RETRACT MODES OF OPERATION

FIELD OF THE INVENTION

The invention relates generally to work vehicles. More particularly, it relates to auxiliary hydraulic valves and controllers for work vehicles. Even more particularly, it relates to automated methods and structures for adjusting separate extend and retract flow rates.

BACKGROUND OF THE INVENTION

This invention provides a way to adjust electronically controlled remote hydraulic valves. It is adaptable for use on all agricultural and construction vehicles equipped with electronically controlled remote hydraulic valves.

Remote hydraulic valves provide auxiliary hydraulic flows to implements that are coupled to vehicles for performing various tasks. Typically, such a vehicle will have several such valves, commonly varying between two and eight. These valves are controlled in an operator station typically in the cab of the vehicle, most commonly by manipulating a lever or knob that provides a signal proportional to the movement of the lever or knob and indicates a desired flow rate to or from an auxiliary hydraulic valve. The hydraulic valves are typically connected to a manifold or manifolds, most commonly located at the rear of the vehicle, to which hydraulic actuators are mounted. These hydraulic actuators include such things as hydraulic motors and cylinders. By varying the position of the lever or knob, the operator can vary the flow direction and the flow rate to the manifold, and thence to the hydraulic actuators located on the implement.

Another common user input device located at the operator station is a flow rate control. The flow rate control is typically a small dial or knob that is set by the operator and indicates a maximum flow rate through the valve. Thus, by rotating the flow rate control, the operator can limit the operating range of the lever or knob from a flow rate of zero (0) to a positive maximum flow rate indicated by the flow rate control, and a negative maximum flow rate, also indicated by the flow rate control.

The flow rate controls typically provide the same maximum flow rates in both extend and retract modes of operation. In other words, when the proportional control lever is moved to one extreme limit, it will give a set flow rate of "X" through the hydraulic valve, based upon the position of the flow rate control. If the proportional control lever is moved to the opposite extreme, indicating a flow rate in the reverse direction through the valve, the operator will get the same flow rate of "X" through the valve, but in the opposite direction. This assumes, of course, that the operator has not moved the flow rate control knob.

Assume that the flow rate control is moved to a position that reduces the maximum flow rate by half. With the flow rate control in this position, moving the proportional control lever to one extreme will cause a flow rate of X/2 and moving the proportional control lever to the other extreme position will cause a flow rate of X/2 in the opposite direction through the valve.

For hydraulic flows that are changed often in the field, such as the hydraulic flows to lift cylinders on plows that rise and lower the plows at the end of each row, operators like to set up a desired flow rate using the flow rate control such that they can merely flick the proportional control lever from one extreme position or limit to the other in order to go from raise to lower, or extend to retract or the like. It is for this reason that the flow rate control is provided. By adjusting the flow rate control, the operator can reduce or increase the maximum flow (i.e. the flow corresponding to full deflection of the proportional control lever) until he can push the lever to its limit, and the implement will move at the desired speed. If he could not adjust the maximum flow rate, he would be forced to twiddle with the lever moving it back and forth in the intermediate region away from either lever limit until he gets the flow rate he desires. This diddling with the lever might also require that he look backward behind the vehicle at the implement to see how fast it is actually raising or lowering. This is dangerous. In addition, and particularly for tractors engaged in cultivating fields, the operator may already have several tasks to perform when he reaches the headlands. For example, instead of a single auxiliary hydraulic valve, he might have several auxiliary hydraulic valves that would all require substantially simultaneous operation, such as shutting off a fertilizer flow with one valve and proportional control lever, lifting a plow with another hydraulic valve and proportional control lever, and raising marker arms with yet another hydraulic valve and corresponding proportional control lever. All of these activities might be required every time the tractor enters a headland at the end of each row. All of the reverse activities of lowering the markers, lowering the plow and starting the fertilizer flow would be required once the farmer turns in the headlands and begins his new row.

The time required to individually set each of these devices to operate at the proper speed (i.e. at the proper flow rate) would be prohibitive if the operator had to carefully position each lever at some intermediate point in the range of each proportional control lever. For that reason a flow rate control is provided for each proportional control lever and hence for each auxiliary valve.

With one of these controls provided for each auxiliary hydraulic valve, the operator can individually adjust each maximum flow rate while he is safely stopped and setting up for cultivating the field. Once the flow rates are adjusted properly, he can merely flick each proportional control lever to one limit (to raise the plow or the markers, for example) and thence flick it to the other limit (to lower the plow or the markers, for example). In order to perform the three separate operations shown above, all he would have to do would be to reach down and flick three levers in a split second from one extreme lever position to the other extreme lever position. This could be done without even looking at the levers or the implement.

As explained above, the flow rate controls adjust the maximum flow rate at each limit. (As an aside, they also adjust all the intermediate flow rates corresponding to all the intermediate positions of the lever since the lever provides flow rates that are proportional to its degree of deflection from a central position toward either lever limit.) For a given position of the flow rate control, the flow rates at either of the proportional control lever limits is going to be the same, but differ in direction. By direction, I mean that flow will proceed out of a first port toward the implement and will be received back from the implement in a second port in a first direction, and will proceed out of the second port toward the implement and will be received back from the implement in the first port when the lever is moved in the other direction. The directions are indicated herein as "retract" and "extend", or "raise" and "lower". This does not mean that they are actually retracting or extending a cylinder, or raising or lowering an implement but are used for convenience to indicate the reversal of flow through the ports as described above.

In most cases, a single maximum flow rate in both the extend direction and the retract direction is sufficient. In some cases, however, it is not.

For example, a farmer may wish to raise a plow rapidly when he reaches the end of a row. By raising it rapidly, he can plow to the very end of the row at full depth. As the plow is lifted, the load on the tractor is reduced. The faster the plow is lifted, the faster the load is reduced.

Lowering the plow is not as easy. If the plow is lowered quite rapidly, the sudden increase in load may stall the tractor. Thus, many farmers are compelled to set a maximum flow rate that will raise the plow rapidly, and must then diddle with either the proportional control lever or the flow rate control in order to lower the plow more gently.

Since conventional systems set both the maximum extend flow rate and the maximum retract flow rate (and set them both equal) when the flow rate control is adjusted, the farmer is unable to have two separate rates of flow, one for extend (i.e. the first direction of flow through the auxiliary hydraulic valve) and a separate flow rate for retract (i.e. in the opposite direction through the auxiliary hydraulic valve).

OBJECTS AND SUMMARY OF THE INVETION

What is needed, therefore is a method an apparatus for separately adjusting an extend flow rate and a retract flow rate for an auxiliary hydraulic valve for a work vehicle.

What is also needed is a way to separately adjust the flow rates such that when the proportional control lever or knob is moved to its extreme position in one direction, it provides a first flow rate, and when it is moved to its other extreme position it gives another different flow rate in the opposite direction.

It is an object of this invention to provide such a method and apparatus.

In accordance with the first embodiment of the invention, a method of individually configuring an auxiliary hydraulic valve for a work vehicle, such that it provides different maximum flow rates for hydraulic fluid flows in opposite directions through the valve, wherein the valve is controlled by a flow rate control for setting a maximum flow rate in both the opposite directions, and is also controlled by a proportional control device having one range of positions for providing a corresponding first range of flow rates in one direction, a central position for providing substantially no flow, and another range of positions for providing a corresponding second range of flow rates in another direction opposite the one direction, the method comprising the steps of electronically selecting a first auxiliary valve from a plurality of available auxiliary valves, electronically selecting a first direction of operation of the first auxiliary valve, electronically selecting a desired first offset signal for the first direction of operation of the first auxiliary valve, and saving the first offset signal in association with an identifier of the first valve and the first direction in an electronic memory. The method may include the steps of electronically selecting a second direction of operation opposite the first direction of operation of the first auxiliary valve, electronically selecting a desired second offset signal different from the first offset signal for the second direction of the first auxiliary valve, and saving the second offset signal in association with an identifier of the first valve and the second direction in an electronic memory. The method may also include electronically selecting a second auxiliary valve from the plurality of available auxiliary valves, electronically selecting a third direction of operation of the second auxiliary valve, electronically selecting a desired third offset signal for the third direction of operation of the second auxiliary valve, and saving the third offset signal in association with an identifier of the second valve and the third direction in an electronic memory.

In accordance with a second embodiment of the invention, an apparatus is provided for selecting and applying separate auxiliary hydraulic valve flow rate offsets from a plurality of offsets for an auxiliary hydraulic valve comprising, a first proportional control input device associated with the auxiliary hydraulics valve, a flow rate control input device associated with the auxiliary hydraulics valve, a microprocessor-based controller coupled to the proportional control input device and the flow rate control input device and configured to periodically scan both the proportional control input device and the flow rate control input device to determine their respective positions, an electronic display coupled to and driven by the microprocessor-based controller and configured to display indicia indicative of (1) the auxiliary hydraulic valve, (2) two opposing directions of flow through the auxiliary hydraulic valve, and (3) a plurality of valve offsets, and an operator input device coupled to the controller and configured to respond to operator manipulations indicative of (1) manual selection of the auxiliary hydraulic valve (2) manual selection of each of the two opposing directions of flow, and (3) manual selection of a desired valve offset of the plurality of valve offsets, and further wherein the controller is configured to monitor the operator input device and, in response to manipulation of the operator input device, to save a first selected valve offset in association with a first selected direction of flow. The controller may be configured to save a second selected valve offset that is different from the first selected valve offset in association with a second selected direction of flow that is different from the first selected direction of flow. The operator input device may be a plurality of switches associated with the electronic display. The electronic display may be a touch screen display and the plurality of switches may include a touch screen switch matrix.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
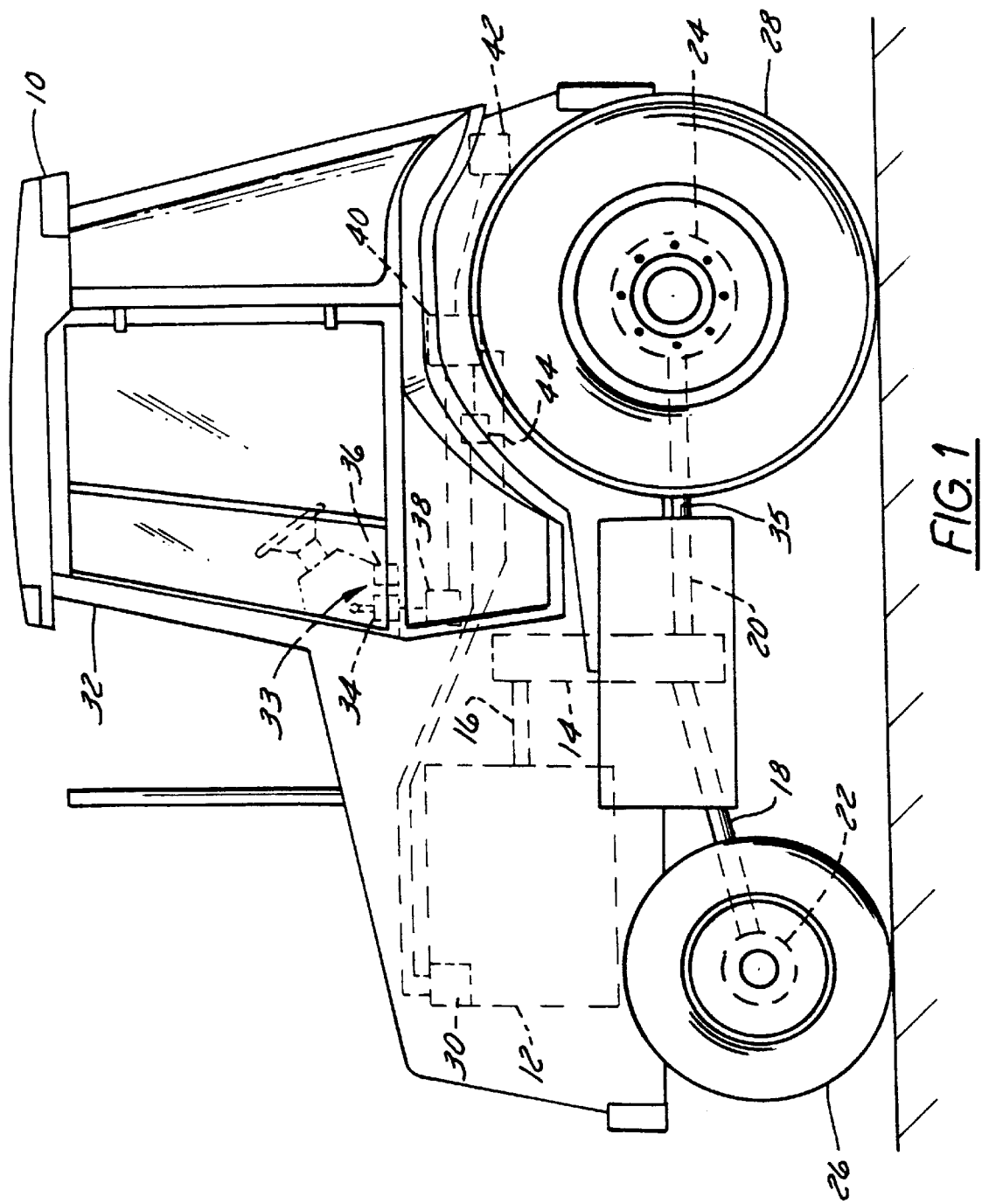
FIG. 1 illustrates a work vehicle, shown as a tractor, having an auxiliary hydraulic valve calibration system in accordance with the present invention.

Referring now to FIG. 1, a vehicle 10 is shown having an engine 12 drivingly engaged to a transmission 14 by a drive shaft 16. These are mounted on a chassis 35. The transmission 14 is in turn coupled through drive shafts 18 and 20 to front differential 22 and rear differential 24. Front wheels 26 are coupled to and driven by differential 22 and rear wheels 28 are coupled to and driven by differential 24. A hydraulic pump 30 is coupled to and driven by engine 12. This pump provides hydraulic fluid to the auxiliary valves.

Inside cab 32 is an operator station 33 that includes a proportional control lever 34 and a flow rate control 36 as well as an electronic display here shown as a touch screen display 37. These controls are coupled to electronic controller 38. Controller 38, in turn, drives the display 37 to provide the operator with indicia indicating each of the auxiliary hydraulic valves, selectable directions of flow for each valve and selectable valve offsets. Controller 38 also receives the operator commands from flow rate control 36 and proportional control lever 34 and converts those operator commands into valve signals which are applied to auxiliary hydraulic control valves 40. Valves 40 regulate the flow of fluid between pump 30 and auxiliary valve manifold 42 located at the rear of the vehicle. Manifold 42 typically includes quick-connect couplings 52 that provide bi-directional flow to implements (not shown) that have mating hydraulic connectors.

The proportional control lever is a manually actuated operator input device, typically including either a lever or a knob, that generates a signal indicative of the lever position. It may include a potentiometer or a shaft encoder to actually provide a computer readable signal to controller 38.

The flow rate control is a manually actuated operator input device, typically including a knob, that generates a signal indicative of the control's position. It may include a potentiometer or a shaft encoder to actually provide a computer readable signal to controller 38.

A load sensing and control circuit 44 is fluidly coupled to valves 40 and pump 30. It receives fluidic signals from each of the auxiliary hydraulic valves and transmits a signal indicative of the hydraulic load on the valves to pump 30. Pump 30, in turn, varies its specific hydraulic output (i.e., the volume of hydraulic fluid per single revolution or cycle of pump 30) in accordance with the load signal that it receives.

Figure 2:
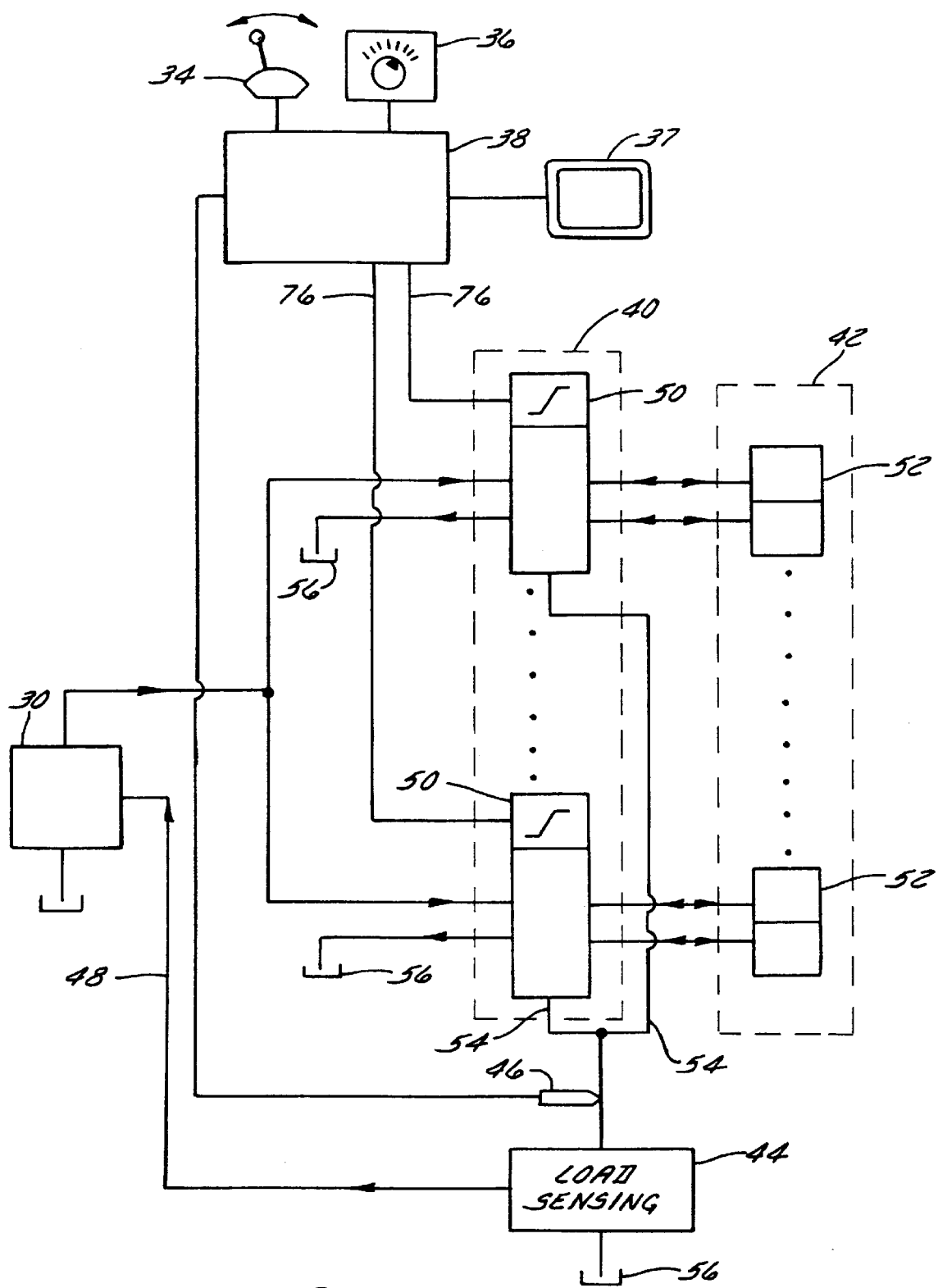
FIG. 2 is a top-level schematic diagram of an auxiliary hydraulic valve control and calibration system.

Referring now to FIG. 2, at least one proportional control lever or knob 34 and flow rate control 36 are coupled to electronic controller 38. A pressure sensor 46 is also coupled to controller 38 and provides a signal indicative of the pressure in load signal line 54. Controller 38 is electrically coupled to valves 40 and generates a valve signal indicative of the degree of desired valve opening for each of the valves. FIG. 2 shows two individual valves for ease of illustration. It should be understood that the system is not limited to any particular number of auxiliary hydraulic control valves. Controller 38 transmits a signal to valve actuators 50. These valve actuators typically include an electrical coil responsive to the current transmitted from controller 38 and open the valve proportional to the current flowing through the actuators. In this manner, controller 38 can selectively apply individual signals to each of the valves causing them separately and independently to open or close.

Each valve is connected to quick-connect couplings 52 located at manifolds 42. There are typically two hydraulic lines extending between each valve and the manifold. As shown by the arrows on the hydraulic lines extending between the valves and the couplings, bi-directional flow is provided in each hydraulic line and depending upon the position of the valve.

The hydraulic valves are also fluidly coupled to load sensing and control circuit 44. The circuit receives a signal from each of the valves that indicates the load placed on the valve on signal lines 54. The signal lines for each valve are combined and are provided to pump 30 on signal line 48. Pump 30, in turn, responds to the load on the valves provided on signal line 48 and regulates its specific displacement based on that load. In this manner, pump 30 need only put out as much pressurized hydraulic fluid as is required to feed each of the hydraulic valves. Each of hydraulic valves 40 are also connected to a hydraulic reservoir or tank 56 for receiving fluid returned from the implement (not shown) that is coupled to quick-connect couplings 52.

Figure 3:
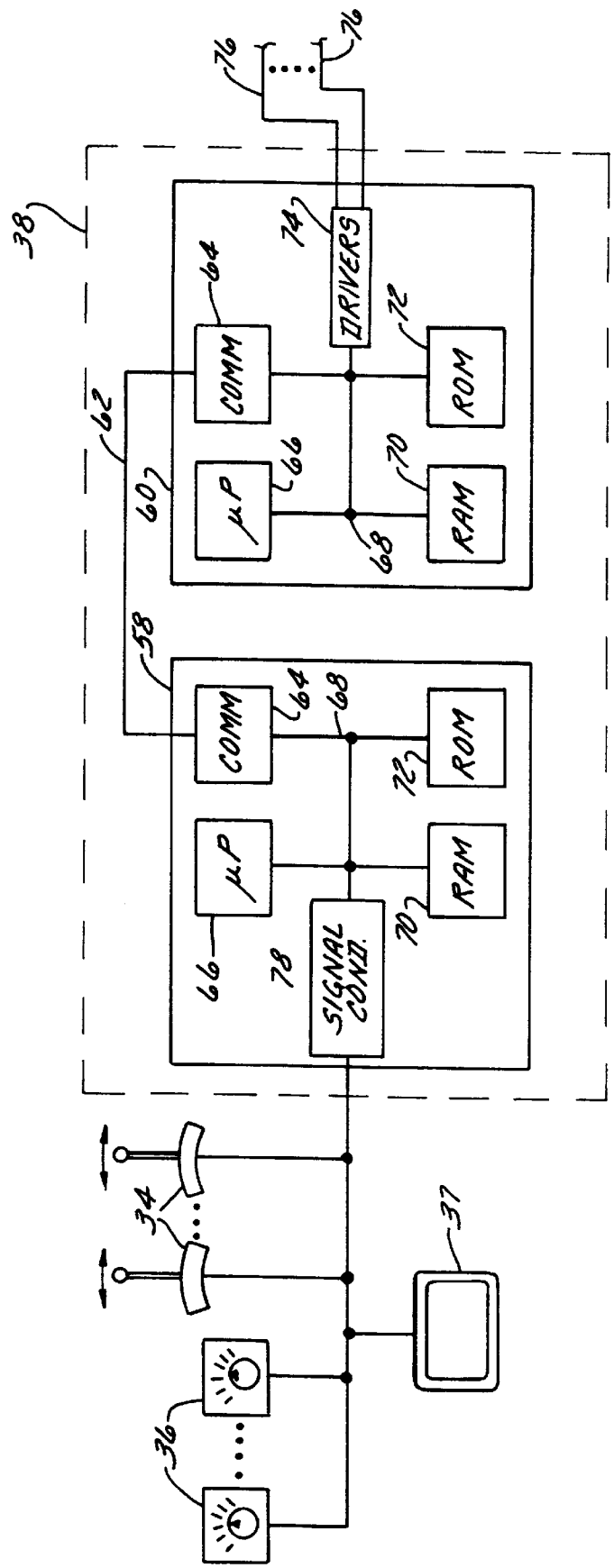
FIG. 3 is a detailed schematic of a microprocessor-based control system and operator controls for driving the auxiliary hydraulic valves.

Referring now to FIG. 3, a preferred arrangement of electronic controller 38 is shown having two separate microprocessor-based controllers 58 and 60. While all of the functionality of the invention claimed herein could be provided by single microprocessor based controller, it is preferable to have several of them. Controllers 58 and 60 communicate over a serial communications link 62, typically configured to carry signals as packets of data in accordance with the SAE J1939 standard. Each controller 58 and 60 includes a communication circuit 64, which converts the packetized data on communications link 62 into a form useable by the microprocessor. Each of controllers 58 and 60 also includes a microprocessor 66 connected to circuits 64 over control/data/address bus 68. A random access memory (RAM) 70 is provided for each controller 58 and 60 and is also coupled to bus 68 to provide working memory for the microprocessors 66. A read only memory (ROM) 72 is also provided in each of controllers 58 and 60 to store the programmed instructions executed by microprocessors 66. Controller 60 includes a driver circuit 74 that is also coupled to bus 68 and responds to signals generated by microprocessor 66. Driver circuit 74 generates the signals on a plurality of signal lines 76 that are coupled to valve actuators 50. Controller 58 also includes a signal conditioning circuit 78 that is coupled to and conditions the signals received from proportional control lever 34 and flow rate control 36. Note that in this embodiment, more than one proportional control lever 34 and flow rate control 36 are coupled to controller 38.

In a typical embodiment, one lever 34 and one control 36 is provided for each of the auxiliary hydraulic valves in the system. In operation, the operator moves a lever 34 to indicate a desired flow rate to one of valves 40. This signal, typically an electrical signal, is received by circuit 78 and is transmitted to microprocessor 66 in controller 58. Microprocessor 66 transmits the value over bus 68 to communications circuit 64 in controller 58. This circuit creates a digital packet including a numeric value indicative of the position of lever 34. Circuit 64 places this packet on serial communications link 62 and it is transmitted to a similar communications circuit 64 in controller 60. Circuit 64 in controller 60 extracts the numeric value from its packetized form and provides it to microprocessor 66 in controller 60. Microprocessor 66, in turn, generates a valve signal indicative of the desired flow rate through the valve corresponding to the lever that was moved and transmits that signal to driver circuit 74. Driver circuit 74, in turn, amplifies that signal and produces a valve signal, which is applied on one of signal lines 76 to the appropriate valve actuator 50 (see FIG. 2). In this manner, electronic controller 38 responds to operator commands and generates an appropriate valve signal.

Once the system has been calibrated, and a value indicative of the dead-band of the valve has been saved in ROM 72, microprocessor 66 will add this as a calibration or offset value to the signal generated by lever 34. This signal, which is a composite of the operator's command and the calibration value, is then provided to driver circuit 74 and thence to actuator 50, as described above. The calibration value can be stored in any of the memory circuits on busses 68. In addition, the combining of the offset value and the command generated by lever 34 can be performed by either of the microprocessors. If the calibration value and the operator's command from lever 34 combined in controller 58, the combined value is packetized and sent over serial communications link 62 to controller 60.

Flow rate controls 36 also generate a signal proportional to the degree of deflection by the operator. In the present system, flow rate controls 36 may be a potentiometer, which generates an electrical signal proportional to the degree of deflection of the potentiometer. It may also be an optical encoder that typically sends out pulses for each increment of deflection. In the case it is a digital device, such as a shaft encoder, controller 58 will add to (or subtract from) the pulses as they are received to determine how far the operator has moved the flow rate control. Alternatively, it could be a monolithic digital device incorporating a shaft encoder-like element that transmits a digital value that's magnitude is proportional to the degree of deflection. All such devices and similar ones for converting a deflection or rotation into a value indicative of the total degree of deflection are well known in the art. The proportional control lever or knob is similarly constructed.

Figure 4:
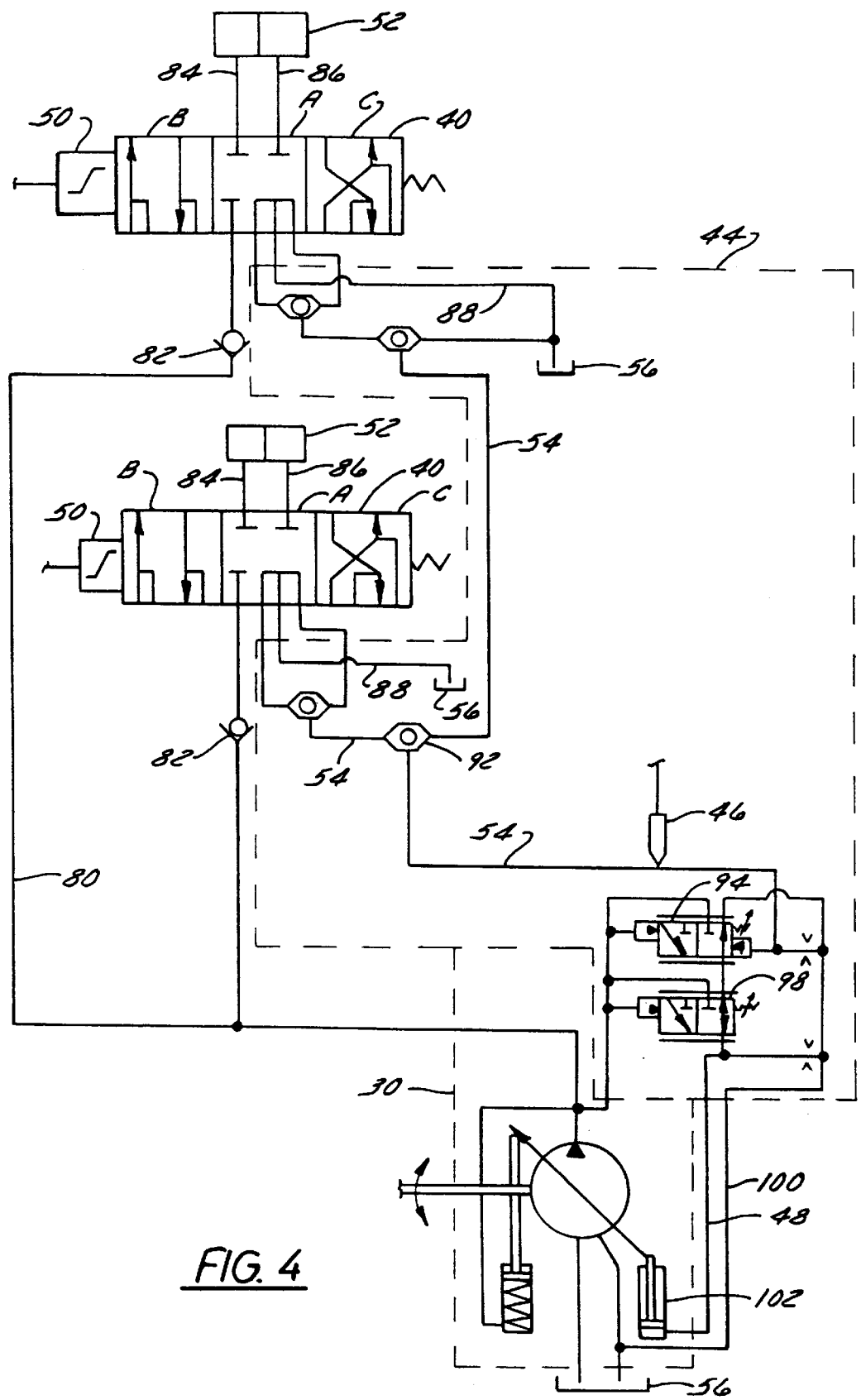
FIG. 4 is a detailed embodiment of a hydraulic pump and valve arrangement together with a load sensing and control circuit for regulating the specific displacement of the pump.

Referring now to FIG. 4, two hydraulic valves 40 are connected to a hydraulic fluid supply conduit 80, which supplies hydraulic fluid under pressure to the valves from hydraulic pump 30. Check valves 82 are disposed in a hydraulic supply conduit to prevent the back flow of hydraulic fluid from the valves to the pump. Depending upon the position of valves 40, fluid from the hydraulic pump is provided to conduits 84 or 86, which extend between valves 40 and quick-connect couplings 52 located in manifold 42.

Hydraulic fluid returning from the actuators coupled to couplings 52 is conducted to hydraulic tank or reservoir 56 through hydraulic conduits 88 that are coupled to and between tank 56 and valves 40. During calibration, actuators 50 cause the valve mechanism to shift from the closed position "A" to either of positions "B" or "C". Calibration can occur, and preferably does occur, with no device attached to couplings 52 and thus with no fluid flowing either to a loop-back tool or to an implement. Nonetheless, as valve 40 shifts, a flow path between conduit 80 and signal conduit 54 begins to open. Hydraulic fluid flows into conduit 54 as the valve is physically cracked and is applied to load sensing circuit 44. Signal conduit 54 is common to both of the valves 40 shown in FIG. 4. As each valve is separately cracked during calibration, they are joined together at bi-directional check valve 92 in such a manner that the cracking of either valve causes hydraulic fluid to flow into conduit 54 which is therefore common to both the illustrated valves. Although there are only two valves shown in FIG. 4, for convenience, any number of auxiliary valves can connected to a common load sensing circuit by a signal line 54.

The particular load sensing circuit 44 shown in FIG. 4 uses two valves to control the specific output of pump 30: valves 94 and 98. As one or the other (or both) of valves 40 are cracked, pressure is applied to signal line 54 and is communicated to valve 94. This signal line pressure is applied to the valve causing it to shift toward the position shown in FIG. 4. As a result, signal line 48 is connected through valves 98 and 94 to tank 56 via conduit 100. This causes piston and cylinder arrangement 102 to change its position as fluid travels from arrangement 102 to tank 56 through valves 94 and 98. Arrangement 102 is coupled to the other components of pump 30 to vary the specific output of the pump.

Sensor 46 is coupled to signal line 54 and detects hydraulic fluid pressure fluctuations in that signal line. It is a fluid node common to both (all) of valves 40 due to the construction of signal line 54 and thus can be used to measure the cracking open of each of the valves 40. As a result, when a valve 40 being calibrated just cracks open, hydraulic fluid will flow from conduit 80 into that valve, then out of that valve on signal line 54 to load sensing circuit 44. This causes a pressure fluctuation on signal line 54, which is, in turn, detected by pressure transducer 46. A pressure fluctuation measured at transducer 46 is therefore indicative of any of valves 40 just cracking open. Note that this sensing of actual valve opening is independent of any flow through quick-connect couplings 52. In this manner, pressure transducer 46 and controller 38 can sense actual valve opening regardless of any flow or lack thereof through couplings 52. This permits the elimination of a separate loop-back testing tool that might otherwise be required to be connected to couplings 52.

Automatic Calibration of Valves

Figure 5:
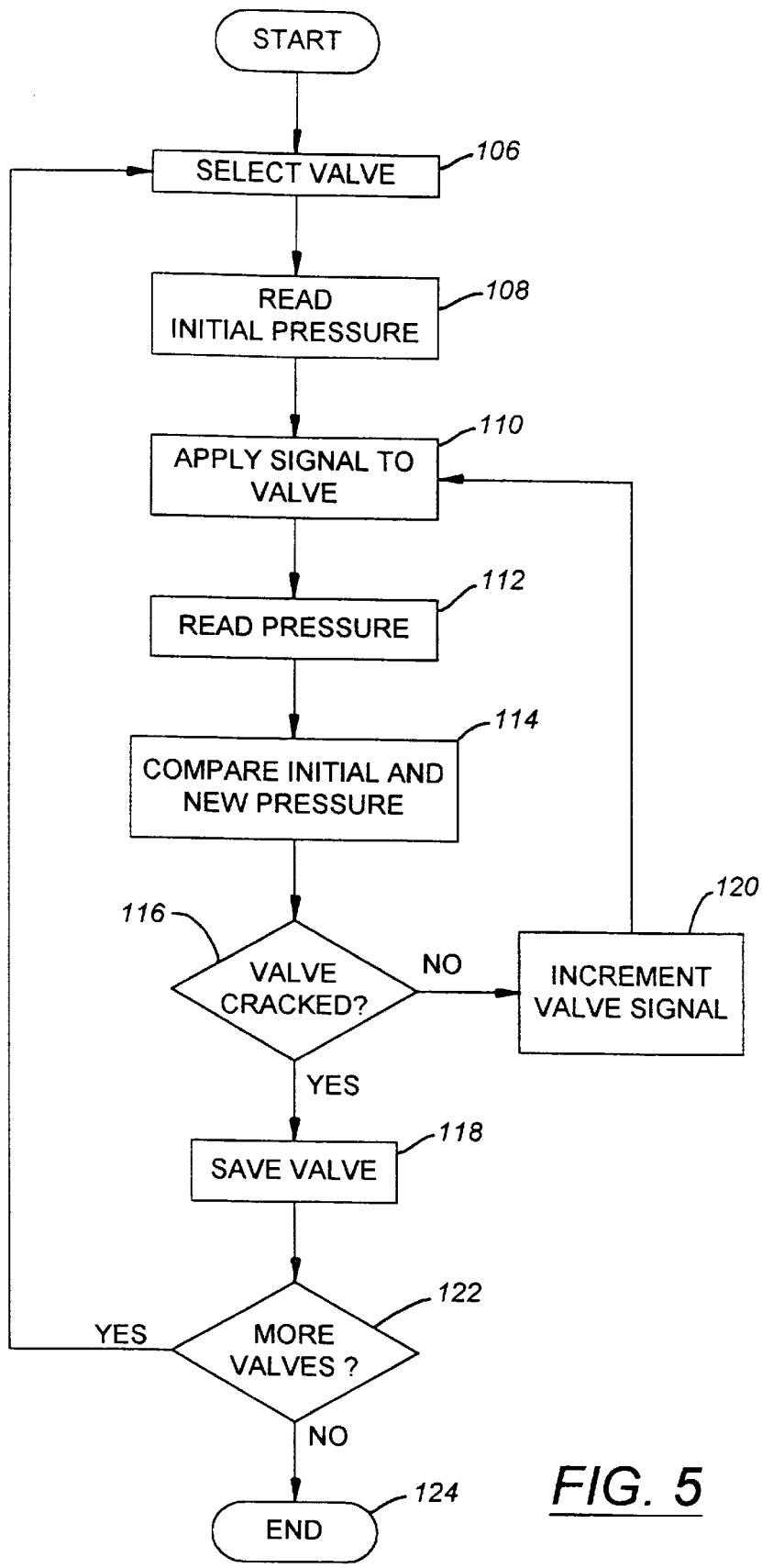
FIG. 5 is a flow chart showing the mode of operation of the system when calibrating each of the auxiliary hydraulic valves.

In FIG. 5, a flow chart of the calibration process performed by controller 38 is illustrated. In the first step, Step 106, controller 38 selects a valve to be calibrated. Controller 38 then reads the initial pressure at transducer 46 indicative of pressure on a load sensing signal line. This value is saved and is used as reference in future calibration calculations for that valve.

In Step 110, controller 38 applies an initial small signal to the valve that was selected for testing in Step 106. Once the signal is applied, controller 38 reads the pressure at pressure sensor 46 in Step 112 to determine whether the pressure has changed. The pressure measured in Step 112 is compared with the initial pressure measured in Step 108 in Step 114. If the pressure has changed sufficiently, as shown in Step 116, controller 38 saves a value indicative of the signal applied to actuator 50 in Step 118. The selected valve is now calibrated.

On the other hand, if the controller's comparison of the two pressures does not indicate that the valve is cracked open, controller 38 increments the signal applied to the valve in Step 120 and processing returns to Step 110. With this incremented valve signal, controller 38 again reads the pressure in Step 112 and compares the initial pressure with the new pressure in step 114. This process of incrementing the valve signal, (the signal applied to the valve actuators 50), is repeated until controller 38 determines that a sufficient difference between the initial or reference pressure and the newly measure pressure at transducer 46 exists. At which point, a value indicative of the signal applied to actuator 50 that was just sufficient to crack the valve is saved in Step 118, as described above.

Once one valve has been calculated, controller 38 then determines if there are more valves to be calculated in Step 122. If there are, processing returns to Step 106 and the new valve is selected. The pressure is incremented until this new valve cracks as described in the paragraphs above.

Controller 38 again checks whether there are additional valves in Step 122, and if there are, it again repeats the calibration process of the Steps 106 through 118.

Ultimately, all the auxiliary hydraulic valves in the system will be calibrated and the answer to the question in block 122 will be "no". At this point, the calibration process ends at block 124.

If a non-zero calibration value is produced for any of the valves, it is combined with the proportional control input device position valve ($V_F$) (e.g., the lever or knob and the flow rate control position value ($V_P$) as a calibration value ($V_C$) in the following equation to determine the actual valve signal:

$$\text{Valve signal} = (V_L \times V_P) + V_C$$

Setting Flow Rate Offsets

The process performed above determines the constant calibration factor for each valve that is typically used to compensate for frictional effects and other dissimilarities between valves. In addition to this, the valves can be adjusted or configured to provide a different flow rate in the "extend" mode than they provide in the "retract" mode. These modes of operation refer to the direction of flow through the valves. As shown in FIG. 4, each valve 40 is bi-directional. In position "B" fluid flow goes one direction through the valve. In position "C", fluid flow goes the reverse direction through the valve. One of these directions we will refer to as the "retract" direction. The other we will refer to as the "extend" direction.

This different flow is provided by associating a valve offset with each of the valves and furthermore, with each of the directions (extend and retract) for each of the valves.

Figure 6:
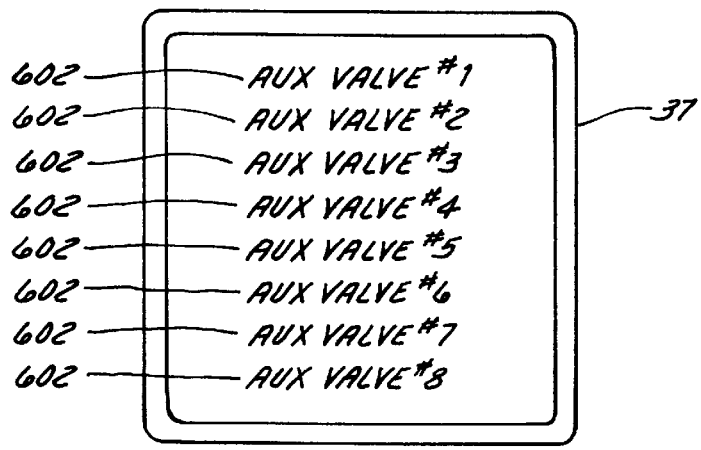
FIG. 6 shows the electronic touch screen display with visual indicia permitting selection of a specific auxiliary hydraulic valve.

To determine the offset, controller 38 transmits a series of electronic signals to display 37, causing it to display a series of indicia. Display 37 includes a display element, such as an LCD or an electroluminescent display and a touch-screen switch matrix disposed one on top of the other. When the system enters the offset setting mode, the display appears as shown in FIG. 6. Each valve has indicia 602 that indicate each of the auxiliary hydraulic valves. To select auxiliary valve 6, for example, the operator would press indicia 604 which indicates auxiliary valve number 6. Controller 38 will decode the operator's selection and determine which valve the operator was selecting suing conventional touch screen decoding techniques. This valve is then saved in the electronic memory of controller 38 for future reference.

Figure 7:
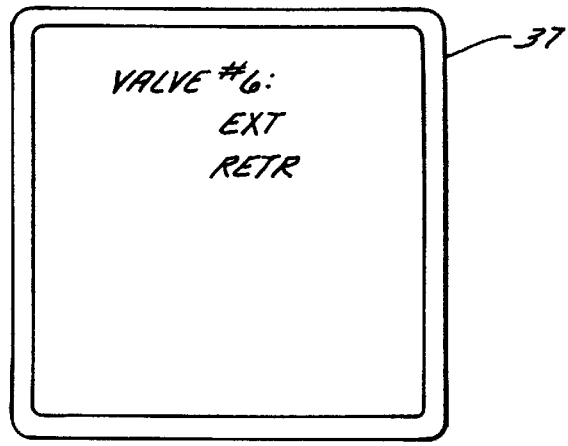
FIG. 7 shows the electronic touch screen display with indicia permitting the selection of a desired direction of flow through the auxiliary hydraulic valve.

Once the operator selects a valve, controller 38 then transmits a sequence of electrical signals to display 37 and causes it to appear as shown in FIG. 7. In this FIGURE, the display presents indicia that permit the operator to select between the two possible directions of fluid flow through valve 6: either the extend mode (shown by the "EXT" indicia in FIG. 7) or the retract mode (shown by the "RETR" indicia in FIG. 7). By pressing on the touch screen switch matrix over the desired indicia, the operator can select either one or the other directional modes. As in the example above, controller 38 will then decode the operator's selection and will determine the selected direction. This direction is then saved (typically as a numeric value) in the electronic memory of controller 38.

Figure 8:
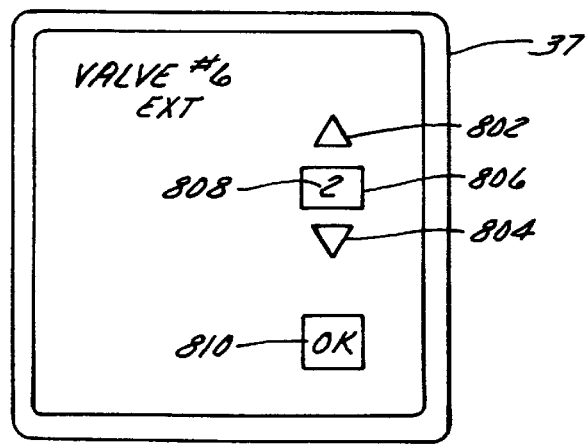
FIG. 8 shows the electronic touch screen display with indicia permitting the selection of a desired auxiliary hydraulic valve offset.

Once the operator selects a direction, controller 38 then transmits another set of electrical signals to the touch screen display and provides the user with a further choice of the amount of offset to the valve signal. As shown in FIG. 8, these indicia include an up arrow 802 and a down arrow 804 surrounding a small box 806 that has a number 808 indicating the currently selected offset. The initial value that appears in the box is the previously selected offset for the valve selected by the operator and the direction selected by the operator. Controller 38 maintains for each valve and each direction of that valve a numeric value corresponding to the offset shown in the box. Note that the valve number ("6") of the selected valve, and the selected directional mode ("EXT") are also displayed by controller 38 on the touch screen display in subsequent screens after selection as a reminder to the operator of his previous selections.

The operator may then change the offset value, either by increasing or decreasing it using the up and the down arrows, respectively. Each press of the touch screen switch matrix over the desired arrow signals controller 38 to change the value in the box either up or down by a value of one. Once the operator has selected the desired offset value, he presses the touch screen switch matrix over the "OK" indicia 810, and controller 38 then saves the offset value together with a value indicative of the selected auxiliary valve and a value indicative of the selected direction of flow (either extend or retract) through the selected valve.

The above process can be repeated for all the valves, and for both directions to separately set two offset values (extend and retract) for each valve. These values are saved in the electronic memory of controller 38 so they can be later accessed and used to calculate the appropriate valve signal for the corresponding valve.

During normal operation, controller 38 periodically polls the flow rate controls and the proportional control lever or knob every 10 milliseconds or so to determine whether the operator has moved either device. When the operator moves an input device 34 or 36, controller 38 senses the change virtually instantly, recalculates the appropriate valve signal and applies that signal to the corresponding valve.

The proportional control lever 34 is coupled to a potentiometer or to a shaft encoder (not shown), which is in turn coupled to controller 38. These devices generate a signal indicative of the lever's position that is received by and converted in controller 38 into a numeric value. The exact range of values produced when the lever is moved through its entire range of motion from stop to stop is purely arbitrary, however.

For the sake of illustration, let us assume that the lever value varies from −100 to +100 when the lever is moved from the maximum retract flow rate position (i.e. one mechanical lever limit) to the maximum extend flow rate position (the other mechanical lever limit). An intermediate or central position generally midway between these two limits would provide a value of 0 and would be indicative of a desired zero flow rate, neither extend or retract.

The flow rate control 36 is a similar device. It, too, is coupled to a potentiometer or to a shaft encoder. These devices generate a signal indicative of the flow rate control's position that is then converted in controller 38 (to which they are coupled) into a numeric value. The exact range of values produced when the flow rate control is moved from stop to stop is purely arbitrary, however. For the sake of illustration let us assume that the flow rate control value can varies from 0 (indicative of a zero flow rate) to +100 (indicative of the maximum desired flow rate through the valve) when it is moved from an extreme counter-clockwise position to an extreme clockwise position. An intermediate position generally midway between these two limits would provide a value of 50 and a maximum flow rate of approximately one half of the maximum possible flow rate through the valve. Again, these values are chose strictly for the sake of illustration. A competent programmer could use any range of values and adjust his program's calculations accordingly.

When controller 39 polls all the proportional control levers and flow rate controls every 10 milliseconds, it recalculates and applies a new valve signal to the valve whose associated proportional control lever and flow rate control was manually adjusted by the operator. If the input devices for all the valves are manipulated, controller 38 will recalculate and apply a new valve signal to all the valves.

In order to determine which of the two offsets (if both are set) to use in its calculations of the valve signal, controller 38 must determine whether the proportional control lever is in the "retract" or the "extend" range of positions. As noted above, the retract range of lever 34 positions generate values between −100 and 0. The extend range of lever 34 positions generate values between 0 and 100. To determine what "direction" of flow the operator is requesting, and hence which of the extend and retract offsets controller 38 should use; controller 38 is programmed to determine whether the value it receives from the proportional control lever is above or below zero. If the lever value is below zero, the operator has requested that the auxiliary valve direct flow in the retract direction. If it is above zero, the operator has requested that the auxiliary valve direct flow in the extend direction. In this manner controller 38 is programmed to determine the requested direction of flow, and hence the appropriate offset based upon the signal it receives from lever 34. Depending upon which direction the operator has requested, the controller uses the corresponding offset for that valve and for that direction as described below. Thus, for example, if the operator moved the lever 34 to request half maximum flow in the retract direction, the proportional control lever value would be −50.

To calculate the valve signal the controller 38 uses either equations, look up tables, or a combination of the two. In the simplest embodiment, an equation is used.

Equation 1, below, illustrates such an equation. In Equation 1, $V_L$ indicates the proportional control lever value, $V_F$ indicates the flow rate control value, $V_O$ indicates the offset value, and K indicates an arbitrary scaling factor of 1 in this example.

$$V_L*(V_F+V_O)*K = \text{valve signal} \qquad \text{Eqn. 1}$$

In this example the valves 40 will move as far as it can in the extend direction when it receives a signal of +10,000, and as far as it can in the retract direction when it receives a signal of −10,000. These values, however, are just exemplary. Other valves 40 and valve drivers 74 may be configured to operate over other ranges of values.

Equation 1 assumes that the automatic valve calibration process yielded a non-zero value. If a non-zero calibration value exists, the equation would be valve signal=$V_L*(V_F+V_O)*K+V_C$.

It should be understood that by suitable mathematical manipulation in software executed by controller 38, the present system could be used with an auxiliary valve 40 having any range of values indicative of its flow. The example above of a valve swinging between the full flow rates in the extend and retract directions with an applied valve signal of −10,000 to +10,000 is just that: an example. As another example, an auxiliary valve might move from its full extend position to its full retract position (i.e. swing between positions B and C in FIG. 4) when the valve signal is varied from 0 to 5 volts (or amperes). Another valve might similarly move over its entire range when the signal is varied from −100 to +100 volts (or amperes). Another valve might have an integral valve driver that accepts binary values that range from 0 to 32,000, or from −127 to 128.

Whatever a valve's nominal input signal range, and whatever the form of the valve signal, whether a digital value, a constant current or voltage, or a pulse-width modulated current or voltage (to cite just a few of the more common examples) that range can be readily mapped to Equations 1 and 2 (below) in the software that controls the appropriate microprocessor in controller 38.

It should also be noted that it might be necessary to perform an intermediate step of converting the valve signal to a different and proper form before applying it to the valve. In the preferred embodiment, the valve is responsive to a pulse-width modulated valve signal and the valve driver circuit is configured to take the nominal valve signal and convert it into pulse-width modulated form having a higher current before applying it to the valve actuator.

To illustrate how the valve is provided with first and second different flow rates when the proportional control lever is in the extreme extend position and the extreme retract position, without requiring the manual movement of the flow rate control, consider the following example:

Let us assume that the user has entered a value of −10 as the extend offset and −20 as the retract offset in the manner described above. Let us also assume the operator has moved the flow rate control all the way to its position indicating maximum flow, which for this example would correspond to a flow rate control value of 100.

In the full retract mode, i.e. with the proportional control lever pushed against one of its mechanical stops, the value indicative of the proportional control lever position will be −100, the flow rate control value will be 100 and the retract offset will be −20. Combining these three values in Equation 1 yields a valve signal of −100*(100−20) or −8000. Again controller 38 determines which of the two offsets to use in Equation 1 by examining the magnitude of the lever value.

In the full extend mode, i.e. with the proportional control lever pushed against the other of its mechanical stops, the lever value will be 100, the flow rate control will (again) be 100, and the extend offset will be −10. Combining these three values in Equation 1 yields a valve signal of 100*(100−10) or 9000.

As noted above, valve 40 produces flow proportional to the valve signal it receives. A valve signal value of +10,000 will open the valve 100% in the extend direction (i.e. one of valve positions B and C), a valve signal value of −10,000 will open the valve 100% in the retract direction (i.e. the other of valve positions B and C), and a valve signal value of 0 will leave the valve completely closed (i.e. valve position A), permitting no flow in either direction. Intermediate values between these three values will produce proportionate intermediate movement of valve 40 between these three positions, and hence roughly proportionate intermediate flow rates.

In the example above, the proportional control lever will produce |−8000/10,000| or 80 percent of its maximum flow rate when it is in the extreme retract position and |9000/10,000| or 90 percent of its maximum flow rate when it is in is extreme extend position. Thus, by permitting the operator to set individual offsets in the extend mode and in the retract mode, different absolute flow rates can be provided at each of the extreme positions (extreme extend and extreme retract) of the proportional control lever 34, and, of course, at the intermediate positions as well.

The specific equation shown above is not necessary to offset the flow rate curves. In another embodiment, for example, the extend and retract offset values can be combined with the proportional control lever value and the flow rate control value by multiplication, as shown in Equation 2, below. The effect of offsetting the flow rate curves is the same.

$$V_L * V_F * V_O * K = \text{valve signal} \qquad \text{Eqn. 2}$$

By selecting a retract offset value of 0.8 and an extend offset value of 0.9 for use in Equation 2, the same 80 percent and 90 percent limiting flow rates can be provided using Equation 2 as were provided using Equation 1. The only different between Equation 1 and Equation 2 using these values is in the shape of the flow curves (i.e. the proportional control lever position versus hydraulic fluid flow rate curves). The benefits of providing different flow rates at the two extreme positions are the same. Note that is equation also assumes a zero valve calibration value. If a non-zero valve calibration value exists, the equation would be $(V_L * V_F * V_O + V_C)K =$ valve signal.

In another embodiment for example, the extend and retract offset values can be combined with the proportional control lever value and the flow rate control value to shift a default curve up and down, or left and right, as shown in Equations 3 and 4, below.

As in the embodiments of Eqns. 1 and 2, Equations 3 and 4 can offset the extend and retract flow rates differently and can also provide for different maximum flow rates in the extend mode as well as the retract mode.

$$\text{Valve signal (for } V_L > 0\text{)} = \text{MAX}\{(V_L * V_F) + V_O, 0\} \qquad \text{Eqn. 3}$$

$$\text{Valve signal (for } V_L < 0\text{)} = \text{MIN}\{(V_L * V_F) + V_O,)\} \qquad \text{Eqn. 4}$$

Note that Equation 3 is used to calculate the valve signal in the extend mode ($V_F > 0$) for the −100 to +100 valve used in the preceding examples, and Equation 4 is used to calculate the valve signal in the retract mode ($V_F < 0$). The MAX function returns the maximnum of the two factors separated by commas in the brackets. The Min function returns the minimum of the two factors separated by commas in the brackets. As in the examples of Equations 1 and 2, Equations 3 and 4 are programmed into controller 38.

By selecting a retract offset value of +2000 and an extend offset value of −1000 for use in Equations 3 and 4, they produce the same 80 percent and 90 percent limiting flow rates of −8000 and +9000 that were produced using Equations 1 and 2.

The difference between the offset curves of Equations 1 and 2 and the offset curves of Equations 3 and 4 using these values, is in the changed shape of the flow curves (i.e. the proportional control lever position versus hydraulic fluid flow rate curves).

Figure 9:
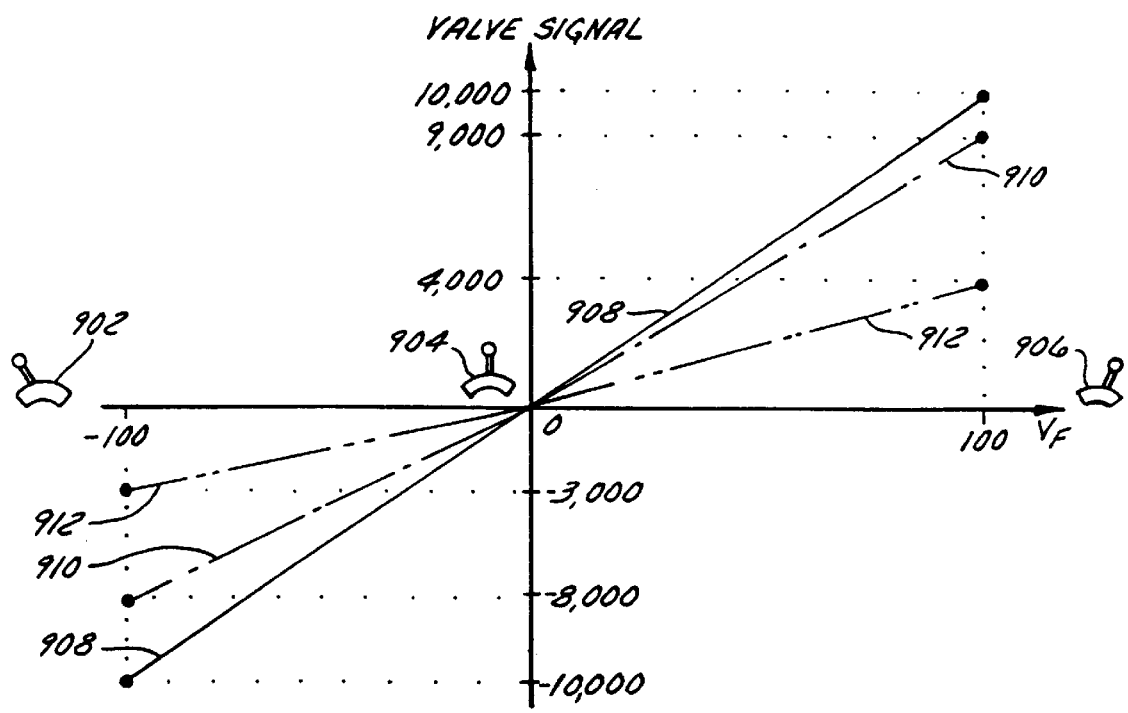
FIG. 9 is a graph of proportional control input device (lever) position shown on the x-axis as the lever value versus the flow rate through the valve, shown on the y-axis as the valve signal value for three different flow regimes, a first regime in which there is no extend or retract offset, a second regime in which there is an extend and retract offset, and a third regime using the same offsets but with a reduced flow rate control value wherein a first method of combining flow rate offsets with lever position and flow rate control position is used.
Figure 10:
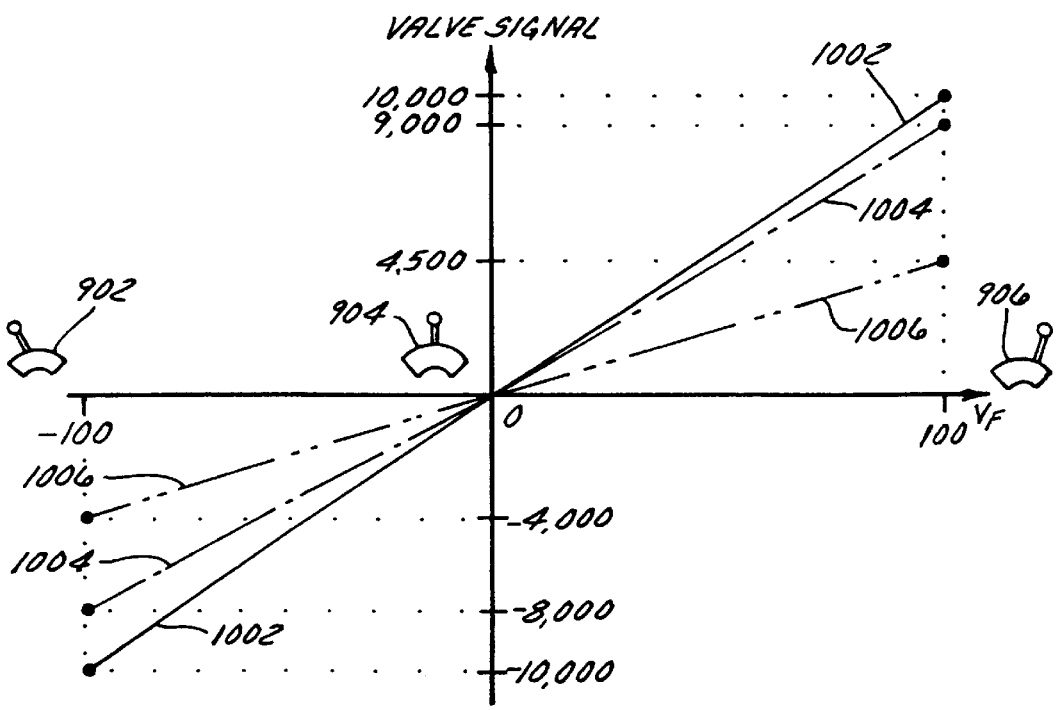
FIG. 10 is another graph of proportional control input device (lever) position shown on the x-axis as the lever value versus the flow rate through the valve, shown on the y-axis as the valve signal value, for three different flow regimes, a first regime in which there is no extend or retract offset, a second regime in which there is an extend and retract offset, and a third regime using the same offsets but with a reduced flow rate control value wherein a second method of combining flow rate offsets with lever position and flow rate control position is used.
Figure 11:
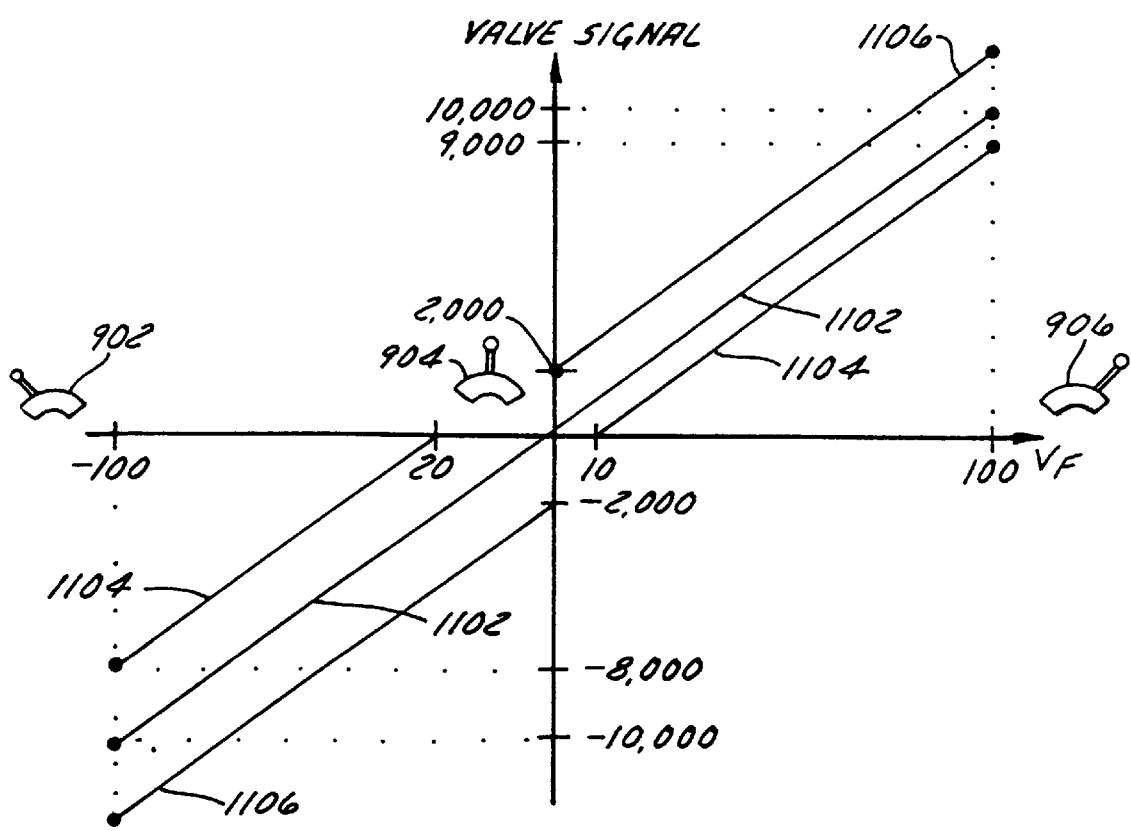
FIG. 11 is yet another graph of proportional control input device (lever) position versus flow rate through the valve (shown as the valve signal) for three different flow regimes wherein an third method of combining the lever position, the flow rate control position and flow rate offsets is used.

The differences and similarities between flow curves offset using Equation 1, Equation 2, and Equations 3 and 4 can be seen by comparing the lever position versus hydraulic flow rate curves of FIGS. 9, 10, and 11, respectively.

FIG. 9 shows a flow curve of lever position versus flow rate, wherein the lever position is expressed as the lever value over the range −100 to +100, and the flow rate is expressed as the valve signal value over a range of −10,000 to 10,000. A lever position of zero and the corresponding flow rate of 0 indicate the intermediate lever position midway between the extreme limits of lever travel wherein a zero flow rate through the valve is provided. The small icons 902, 904 and 906 at the −100, 0, and +100 lever positions illustrate what a typical lever 34 might look like at each of these lever positions.

FIG. 9 illustrates a flow curve 908 with retract and extend offsets of zero using Equation 1 and a flow rate control set to 100. Note that the flow rates at each of the extreme lever positions are the same for this curve. With no separately selected offsets, the valve provides the same flow rates in both directions when the lever is moved from one extreme position to the other. This is the traditional mode of operation of an auxiliary hydraulic system.

A second flow curve 910 is also illustrated showing the effect of the −10 and −20 offsets that are used in Equation 1. Note how both the extent and the retract flow curves have been offset from the nominal (i.e. no offsets) flow curve 908. Note also that at the extreme lever positions, indicated by the lever values of 100 and −100, two different flow rates are provided: a flow rate of −8000 and a flow rate of 9000. This shows how the operator can offset the flow curves differently for retract operation as for extend operation.

It should be noted that providing different flow rate curves in the extend and the retract mode does not require that two offsets be set. Setting a single offset for either the extend or retract curves is sufficient.

The effect of moving the flow rate control is also shown in FIG. 9. A third flow rate curve 912 is shown that is equivalent to the offsets of −10 and −20 used for curve 910, but with the flow rate control moved to its midpoint, at which it generates a signal of 50. Moving the flow rate control to this intermediate position scales both the extend and retract curves 910 by about 50 percent but preserves the differentness of the flow rates at the two extreme positions. At lever positions of −100 and +100, with a flow rate control setting of 50 and the −10 and −20 offsets, the flow rates are not −8000 and +9000, but are −3000 and +4000. The extend and retract flow rates are still different at the extreme lever positions, but have been reduced proportionately by rotating the flow rate control knob.

FIG. 10 illustrates a flow curve 1002 with extend and retract offsets of zero and the flow rate control set to 100 using Equation 2. Note that, just as in the case of curve 908 in FIG. 9, the flow rates at each of the extreme lever positions (−100,+100) are the same for curve 1002 (−10,000; +10,000). Indeed, curve 1002 is identical to curve 908. With no separately selected offsets, the valve provides the same flow rates in both directions when the lever is moved from one extreme position to the other. Again, this is the traditional mode of operation of an auxiliary hydraulic system.

A second flow curve 1004 is also illustrated showing the effect of the 0.9 and 0.8 offsets that are used above in the example of Equation 2. Note how both the extend and the retract flow curves have been offset from the nominal (i.e. no offsets) flow curve 1002. Note also that at the extreme lever positions, indicated by the lever values of −100 and +100, two different flow rates are provided: a flow rate of −8000 and a flow rate of 9000. This example also shows how the operator can offset the flow curves differently for the retract positions of lever 34 than he does for the extend positions of lever 34 by using a different mathematical process of combining the lever value, the flow rate control value and the offsets implemented in the software of controller 38.

As in the example of FIG. 9, the effect of providing different flow rate curves in the extend and the retract mode can be provided by changing a single offset. Both extend and retract curves need not be changed to provide different flow rate curves and different flow rates at the extreme extend and the extreme retract lever positions.

The effect of manual changes to the flow rate control is also shown in FIG. 10. A third flow rate curve 1006 is shown that is equivalent to the offsets of 0.8 and 0.9 used for curve 1004, but with the flow rate control moved to its midpoint at which it generates a signal of 50. Moving the flow rate control to this intermediate position scales both the extend and retract portions of curve 1004 by about 50% but preserves the differentness of the flow rates at the two extreme positions. At lever positions of −100 and +100, with a flow rate control setting of 50 and the 0.8 and the 0.9 offsets, the flow rates are not −8000 and +9000, but are −4000 and +4500. The extend and retract flow rates are still different at the extreme lever positions, but have been reduced proportionately by rotating the flow rate control knob which scales the maximum flow rates.

FIG. 11 illustrates a flow curve 1102 with extend and retract offsets of zero and the flow rate control set to 100 in Equation 3 for the extend range of values (O<$V_L$≦100) and Equation 4 for the retract range of values (−100≦$V_L$<O). Note that, just as in the case of FIGS. 9 and 10, the flow rates at each of the extreme lever positions (−100, +100) are the same for curve 1102 (−10,000; +10,000). Indeed, curve 1102 is identical to curve 908 and 1002. With no separately selected offsets, the valve provides the same flow rates in both directions when the lever is moved from one extreme position to the other. Again, this is the traditional mode of operation of an auxiliary hydraulic system.

VALVE SIGNAL=MAX{($V_L$*$V_F$)+$V_O$,∅}*K     Eqn. 3

VALVE SIGNAL=MIN{($V_L$*$V_F$)+$V_O$,∅}*K     Eqn. 4

If the valve calibration value $V_C$ is non-zero, the equations would be VALVE SIGNAL=MAX {($V_L$*$V_F$)+$V_O$+$V_C$, ∅}*K and VALVE SIGNAL=MIN {($V_L$*$V_F$)+$V_O$+$V_C$, ∅}*K.

A second flow curve 1104 is also illustrated showing the effect of the −1000 and +2000 offsets that are used above in the example of Eqautions 3 and 4. Note how both the extend and the retract flow curves have been offset from the nominal (i.e. no offsets) flow curve 1102. Note also that at the extreme lever positions, indicated by the lever values of −100 and +100, two different flow rates are provided: a flow rate of −8000 and a flow rate of 9000. This example also shows how the operator can offset the flow curves differently for the retract positions of lever 34 than he does for the extend positions of lever 34 by using yet another mathematical process of combining the lever value, the flow rate control value and the offsets implemented in the software of controller 38.

In this example, flow curve 1102 has a constant slope for the given flow rate control setting of 100. When flow curve 1102 is offset, as shown by curve 1104, the slope is no longer constant, but increases as $V_L$ increases. In the region 0<$V_L$<10, the slope is zero. In the region 10<$V_L$<100 the flow curve 1104 slope is greater than zero.

From one perspective, offsetting the flow curve using Equations 3 and 4 causes at least a portion of the flow curve to shift side-to side. For example, if we compare flow curve 1102 (un-offset) with flow curve 1104 (offset by −1000) in the extend region of the curve (0<$V_L$<100), flow curve 1104 is the same as flow curve 1102, but is shifted rightward by a $V_L$ of +10.

From another perspective, offsetting the flow curve using Equations 3 and 4 causes at least a portion of the flow curve to shift up and down. For example, if we again compare flow curve 1102 (un-offset) with flow curve 1104 (offset by −1000) in the extend region of the curve (0<$V_L$<100), flow curve 1104 is the same as flow curve 1102, but shifted downward by a change in valve signal of −1000.

The same is true of the offsetting change from curve 1102 to curve 1104 in the retract region of the flow curve (−100<$V_L$<0)

A third flow curve 1106 is illustrated for completeness in FIG. 11. This curve shows how flow curve 1102 would be offset if a positive offset of +2000 was used in the extend mode and a negative offset of −2000 was used in the retract mode in the embodiment of Equations 3 and 4.

Note that the effect of a positive offset in the extend portion ($V_L$>0) of the flow curve is to shift flow curve 1102 (no offset) upward to the position of flow curve 1106 (offset=+2000). in another sense, the effect of adding and extend offset of +2000 is to shift flow curve 1102 to the right. An offset of this form is particularly beneficial when an operator is using an auxiliary hydraulic device that requires a higher flow rate in order to begin operation. By moving the lever as little as one count (from $V_L$=0 to $V_L$=1) the auxiliary valve will immediately have a significant flow rate equivalent to a valve signal of 2000. Similarly, a change from $V_L$=0 to $V_L$=−1 will produce a flow rate equivalent to a valve signal of −2000.

Using the above system, the operator no longer has to carefully adjust the proportional control lever or the flow rate control to get different extend and retract flow rates. He can instead set the appropriate flow rates using the two offsets and can then operate in the field by merely moving the proportional control lever from one extreme position to the other.

Using the example disclosed in the Background of the Invention, the operator can lift a plow coupled to an auxiliary hydraulic valve at a fast rate by moving the proportional control lever to one extreme position and can lower the plow at a slow rate by moving the proportional control lever to the other extreme position. Adjusting the flow rate control or the proportional control lever to intermediate positions to get different extend and retract flow rates every time he enters a the headland at the end of each crop row is no longer required.

At the same time, however, the system preserves the traditional mode of operation in which the flow rates in the two extreme lever positions are the same: by setting extend and retract offsets to each other, or more conveniently, by setting them both to zero the flow rate control and the proportional control lever will perform in the traditional fashion described in the Background of the Invention.

In addition, it should be clear that the traditional function of the flow rate control has been preserved as well: by moving the flow rate control, both the extend and retract flow curves are scaled generally the same as they were in traditional auxiliary hydraulic valve systems.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, some of the calculations can be eliminated by using lookup tables. Lookup tables are particularly useful in application where the flow curves should have a particular shape yet processing speed cannot be permitted to suffer. A preferred flow curve shape is, for example, an exponential curve, which is best, provided by precalculated tabular data or by piecewise linearization. Both lookup tables and piecewise linearization are well known in the art. In addition, different flow rate curves for extend and retract modes can also be provided by providing two separate flow rate controls instead of the offset-setting process described above, wherein one flow rate control is operable in the extend mode and the other flow rate control is operable in the retract mode. Even further, the sequence of steps in entering the various offsets are described herein as selecting a valve, then selecting a direction, then selecting an offset. There is no need that these steps be performed in this or any other order, nor does the order in which they are performed form any part of the invention. One skilled in the art would recognize that as long as the end result is an offset associated with a flow direction and valve, then controller 38 will have sufficient information. Furthermore, the flow rate control and the proportional control lever or knob may be constructed in a variety of forms, such as in the form of a slider, a joystick, a thumbwheel, knobs or levers, to name just a few.

What is claimed is:

1. A method of individually configuring an auxiliary hydraulic valve for a work vehicle such that it provides different maximum flow rates for hydraulic fluid flows in opposite directions through the valve, wherein the valve is controlled by a flow rate control for setting a maximum flow rate in both the opposite directions, and is also controlled by a proportional control device having one range of positions for providing a corresponding first range of flow rates in one direction, a central position for providing substantially no flow, and another range of positions for providing a corresponding second range of flow rates in another direction opposite the one direction, the method comprising the steps of:

electronically selecting a first auxiliary valve from a plurality of available auxiliary valves;

electronically selecting a first direction of operation of the first auxiliary valve;

electronically selecting a desired first offset signal for the first direction of operation of the first auxiliary valve; and saving the first offset signal in association with an identifier of the first valve and the first direction in an electronic memory.

2. The method of claim 1, further comprising the steps of:

electronically selecting a second direction of operation opposite the first direction of operation of the first auxiliary valve;

electronically selecting a desired second offset signal different from the first offset signal for the second direction of the first auxiliary valve; and saving the second offset signal in association with an identifier of the first valve and the second direction in an electronic memory.

3. The method of claim 1 further comprising the steps of:

electronically selecting a second auxiliary valve from the plurality of available auxiliary valves;

electronically selecting a third direction of operation of the second auxiliary valve;

electronically selecting a desired third offset signal for the third direction of operation of the second auxiliary valve; and saving the third offset signal in association with an identifier of the second valve and the third direction in an electronic memory.

4. The method of claim 1, further comprising the steps of:

retrieving a position of a proportional control input device;

retrieving a position of a flow rate control device;

determining the first direction from the position of the proportional control input device;

combining a value indicative of the position of the proportional control input device, a value indicative of the position of the flow rate control device, and the first offset in a microprocessor to produce a combined value;

generating a valve signal from the combined value; and applying the valve signal to the first auxiliary hydraulics valve.

5. The method of claim 2, further comprising the steps of:

retrieving a first position of a proportional control input device;

retrieving a first position of a flow rate control device;

determining the first direction from the first position of the proportional control input device;

combining a first value indicative of the first position of the proportional control input device, a first value indicative of the first position of the flow rate control device, and the first offset in a microprocessor to produce a first combined value;

generating a first valve signal from the first combined value;

applying the first valve signal to the first auxiliary hydraulics valve;

retrieving a second position of a proportional control input device different from the first position of the proportional control input device;

retrieving a second position of a flow rate control device;

determining the second direction from the second position of the proportional control input device that is opposite the first direction of the proportional control input device;

combining a second value indicative of the second position of the proportional control input device, a second value indicative of the second position of the flow rate control device, and the second offset in a microprocessor to produce a second combined value;

generating a second valve signal from the second combined value; and applying the second valve signal to the first auxiliary hydraulics valve.

6. The method of claim 1 wherein the step of electronically selecting a first auxiliary valve includes the steps of:

provide a plurality of visual indicia each representative of the plurality of available auxiliary valves on an electronic display; and selecting one of the plurality of valves from the plurality of visual indicia.

7. The method of claim 6 wherein the step of selecting one of the plurality of valves includes the step of pressing a switch associated with the one of the plurality of visual indicia.

8. The method of claim 7, wherein the electronic display is a touch screen and the step of pressing a switch includes the step of pressing a location on the touch screen visually associated with the one of the visual indicia.

9. The method of claim 1, wherein the step of electronically selecting a first direction of operation of the first auxiliary valve includes to steps of:

providing visual indicia representative of at least one direction of operation on an electronic display; and selecting at least one visual indicia indicative of one of the at least one direction of travel from the visual indicia.

10. The method of claim 9, wherein the step of selecting at least one visual indicia includes the step of pressing a switch associated with the at least one visual indicia.

11. The method of claim 10, wherein the electronic display is a touch screen, and further wherein the step of pressing a switch includes the step of pressing a location on the touch screen visually associated with the at least one visual indicia.

12. An apparatus for selecting and applying separate auxiliary hydraulic valve flow rate offsets from a plurality of offsets for an auxiliary hydraulic valve comprising:

a first proportional control input device associated with the auxiliary hydraulics valve;

a flow rate control input device associated with the auxiliary hydraulics valve;

a microprocessor-based controller coupled to the proportional control input device and the flow rate control input device and configured to periodically scan both the proportional control input device and the flow rate control input device to determine their respective positions;

an electronic display coupled to and driven by the microprocessor-based controller and configured to display indicia indicative of (1) the auxiliary hydraulic valve, (2) two opposing directions of flow through the auxiliary hydraulic valve, and (3) a plurality of valve offsets; and an operator input device coupled to the controller and configured to respond to operator manipulations indicative of (1) manual selection of the auxiliary hydraulic valve, (2) manual selection of each of the two opposing directions of flow, and (3) manual selection of a desired valve offset of the plurality of valve offsets, and further wherein the controller is configured to monitor the operator input device and, in response to manipulation of the operator input device, to save a first selected valve offset in association with a first selected direction of flow.

13. The apparatus of claim 12 wherein the controller is configured to save a second selected valve offset that is different from the first selected valve offset in association with a second selected direction of flow that is different from the first selected direction of flow.

14. The apparatus of claim 13, wherein the operator input device includes a plurality of switches associated with the electronic display.

15. The apparatus of claim 14, wherein the electronic display is a touch screen display and further wherein the plurality of switches includes a touch screen switch matrix.

\* \* \* \* \*